United States Patent [19]

Scholl

[11] Patent Number: 5,609,329
[45] Date of Patent: Mar. 11, 1997

[54] VIBRATION DAMPING ATTACHMENT OF A DRIVE UNIT FOR WINDSHIELD WIPERS

[75] Inventor: Wolfgang Scholl, Gemmrigheim, Germany

[73] Assignee: ITT Automotive Europe GmbH, Germany

[21] Appl. No.: 493,971

[22] Filed: Jun. 23, 1995

[30] Foreign Application Priority Data

Jun. 23, 1994 [DE] Germany ............................ 44 21 878.8

[51] Int. Cl.⁶ ........................................................ B60S 1/24
[52] U.S. Cl. ............................................ 267/141; 267/293
[58] Field of Search .................................... 267/293, 136, 267/140.11, 141, 141.3, 141.4, 141.6, 141.7; 15/250.31, 250.34, 250.46, 250.47; 296/96.15, 96.17, 96.21, 146.15

[56] References Cited

U.S. PATENT DOCUMENTS

| | | | |
|---|---|---|---|
| 2,893,722 | 7/1959 | Beck | 267/141 X |
| 4,306,708 | 12/1981 | Gassaway et al. | 267/141.3 |
| 4,530,491 | 7/1985 | Bucksbee et al. | 267/141 |

FOREIGN PATENT DOCUMENTS

| | | | |
|---|---|---|---|
| 4036367 | 11/1990 | Germany . | |
| 8809449 | 12/1988 | WIPO | 267/293 |

Primary Examiner—Josie Ballato
Attorney, Agent, or Firm—Thomas N. Twomey; J. Gordon Lewis

[57] ABSTRACT

A vibration damping element for attaching a windshield wipers drive unit to an automobile. The element incorporates the assembly screws, in preassembled condition, and retains them in the assembly position on the respective vibration damping element by a detachment prevention portion. To a achieve reliable detachment prevention and to reduce the effort in preassembling the assembly screws, the opening of the vibration damping element is closed by an elastomeric diaphragm attached to the vibration damping element for producing the detachment prevention. The diaphragm has a central hole with a smaller inside diameter than the thread diameter of the assembly screw. Thus, the assembly screw is held captive on the vibration damping element by the edge of the central hole being clamped elastically on the threaded screw stem.

20 Claims, 3 Drawing Sheets

VIBRATION DAMPING ATTACHMENT OF A DRIVE UNIT FOR WINDSHIELD WIPERS

TECHNICAL FIELD

The present invention relates to dampers and more particularly relates to vibration dampers for windshield wiper drives of automotive vehicles.

BACKGROUND OF THE INVENTION

Drive units for windshield wipers are, typically powered by electric motors. In such systems a wiper arm including a wiper blade is attachable unrotatably on the drive shaft of the drive unit which is drivable in pendulum motion and the direction of rotation of which is reversible. A drive unit of this type can also have an electric motor rotating in the same direction of rotation. A gear unit is coupled directly to the electric motor, and the drive shaft of the gear unit is drivable in pendulum motion and can be equipped with a wiper arm in an unrotatable fashion, as described hereinabove. In addition, a drive unit for windshield wipers can include a supporting structure on which a motor-and-drive unit and one or more wiper shafts drivable in pendulum motion are mounted.

In general, drive units for windshield wipers of this type are fitted to the vehicle body by way of vibration damping elastomeric fastening elements, which are undetachably fixed on predetermined attachment points of the drive unit. To this end, assembly screws extend through the vibration damping elements.

To simplify the assembly of the drive unit to the vehicle, it is known to retain the assembly screws in the assembly position on the drive unit for windshield wipers so as to be rotatable about their axes but undetachable. Thus, the drive unit for windshield wipers is supplied as a complete unit with the fastening screws preassembled thereon for mounting to the vehicle. Advantageously, there is no need for additionally manipulating the assembly screws when fitting the drive unit for windshield wipers to the vehicle.

The publication DE 40 36 367 A1 discloses a drive unit for windshield wipers wherein the assembly screws are retained in their assembly position by a detachment prevention means. The assembly screw extends at each individual attachment point through an elastomeric vibration damping element fixed to the windshield. Before this action, a respective spacer sleeve is inserted into the through-bore of the elastomeric vibration damping element. As a detachment prevention means, a disc which is resiliently elastic to a certain extent and includes a hole is slipped onto the part of the threaded stem of the assembly screw which projects from the vibration damping element. The hole in the disc is smaller than the thread diameter of the assembly screw so that the edge of the hole or portions thereof are clamped on the threaded stem of the assembly screw in a resiliently elastic manner and retain the assembly screw in the desired position. The disc of the detachment prevention means can be made of a thin spring steel sheet or any hard plastic, such as hard polyvinyl chloride (PVC).

A disadvantage of the described assembly screw detachment means is that a disc made of hard plastic may be broken during warehousing or transport or assembly. Thus, reliable detachment prevention is not ensured in any case.

Further, prefabrication of the drive unit for windshield wipers requires excessive assembly work because the discs for providing the detachment prevention of the assembly screws must be manipulated separately.

An object of the present invention is to provide a reliable detachment prevention means for assembly screws on a vibration damping attachment of a drive unit for windshield wipers with minimal effort during assembly.

This object is achieved according to the present invention by a vibration damping attachment of a drive unit for windshield wipers of automotive vehicles wherein the opening of the vibration damping element is closed by an elastomeric diaphragm attached to the vibration damping element for providing the detachment prevention. The diaphragm has a central hole with a smaller inside diameter than the thread diameter of the assembly screw. When the assembly screw is inserted into the opening of the vibration damping element, the central hole in the diaphragm is expanded by the threaded stem, whereby the edge of the central hole is clamped with the threaded screw stem. Thus, the assembly screw is held captive in its assembly position on the vibration damping element.

The elastomeric diaphragm fastened to the vibration damping element will not be ruptured. Thus, a reliable detachment prevention means for the assembly screw is provided. The need for an additional part providing the detachment prevention is obviated by attaching the elastomeric diaphragm to the vibration damping element which, in turn, is fixed to the drive unit for windshield wipers. Undetachable preassembly of the assembly screws in their assembly position on the drive unit for windshield wipers necessitates considerably less mounting efforts compared to the state of the art described.

One favorable aspect of the detachment prevention feature is that irrespective of the prevailing geometric shape of the elastomeric vibration damping element, it is possible to cement or vulcanize a diaphragm of equal elastomeric material to the frontal end of the vibration damping element. The central hole in the elastomeric diaphragm may be made either before or after attachment of the diaphragm to the vibration damping element.

A preferred embodiment of the vibration damping element includes designing the elastomeric diaphragm integrally with the vibration damping element. This is particularly favorable for low-cost manufacture of the vibration damping element with detachment prevention for the assembly screw according to the present invention.

It is thereby rendered possible to manufacture a required vibration damping element with integrated assembly screw detachment prevention in one single working step, for example, by injection molding.

In another preferred embodiment, the vibration damping element with assembly screw detachment prevention has an which elastomeric diaphragm forms a bottom for the opening of the vibration damping element in which the assembly screw is inserted.

It is necessary for the reliability of the assembly screw detachment prevention that the assembly screw is retained by the diaphragm with a sufficiently great amount of elastic clamping force. The thickness of the elastomeric diaphragm must be varied accordingly. Small drive units for windshield wipers mostly require relatively low fastening forces on the vehicle. In this case, relatively small assembly screws are sufficient. To ensure reliable detachment prevention for such small assembly screws, it is sufficient that the thickness of the diaphragm is approximately 0.5 times the pitch of the assembly screw. In comparison thereto, correspondingly great fastening forces and, thus, correspondingly large assembly screws are necessary for large-size complex drive units for windshield wipers as used, for example, on motor trucks or buses.

In order that such large assembly screws are reliably retained on the drive unit, a correspondingly large amount of elastic clamping forces of the diaphragm is necessary. It is advisable in such a case that the thickness of the diaphragm is approximately 1.5 times the pitch of the assembly screw. A design of the vibration damping attachment wherein the elastomeric diaphragm has a slotted oval shape is expedient in cases where slight lateral shifts are necessary to accurately position the drive unit during the assembly of the drive unit for windshield wipers on the vehicle. The slotted oval shape of the hole in the diaphragm permits sliding motion of the assembly screw with respect to the hole by a certain amount within its longitudinal extension. In this respect, it is advisable to design the hole of the diaphragm in dependence on the prevailing conditions.

Apart from vibration damping elements which, in the line of vision, in an axial direction of the opening of the vibration damping element, have a circular shape and the opening of which for the assembly screw, accordingly, has a circular cross section, in practice, vibration damping elements have also been applied which have an oval shape and, accordingly, an oval opening for the assembly screws. Such shapes are applicable also to vibration damping elements having an assembly screw detachment prevention according to the present invention.

When the vibration damping element and its opening have an oval shape, it is advantageous that the diaphragm has a slotted oval hole which extends in the longitudinal direction of the vibration damping element. Such a design is particularly favorable if the drive unit for windshield wipers must be displaceable by a slight degree for precise adjustment during fitting to the vehicle. The vibration damping elements must then be aligned with respect to their oval shape alongside the necessary direction of displacement.

A particularly simple and inexpensive design of a vibration damping attachment is possible when acute assembly screws are used. Preferably, the hole in the diaphragm is produced by the tip of the assembly screw in this case, when the assembly screw is inserted into the opening of the vibration damping element for preassembly purposes. Thus, the separate provision of a hole in the diaphragm is not necessary.

In cases where a spacer sleeve, known per se, with a collar on one side is inserted into the opening of the vibration damping element, it is advisable that in the position of the spacer sleeve where the collar of the spacer sleeve abuts on the frontal end of the vibration damping element, there is at least a small distance between the end of the spacer sleeve disposed in the opening and the elastomeric diaphragm.

This provision is intended to prevent that the frontal end of the spacer sleeve inserted into the opening will squeeze or even punch out the diaphragm during the assembly or later when the drive unit for windshield wipers is mounted on the vehicle. In this case, reliable assembly screw detachment prevention would not be ensured or would even be impossible when the drive unit for windshield wipers is dismounted from the vehicle.

The present invention will be described hereinbelow by way of one embodiment with reference to the accompanying drawings.

DETAILED DESCRIPTION OF THE PREFERRED EMBODIMENTS

Figure 1:
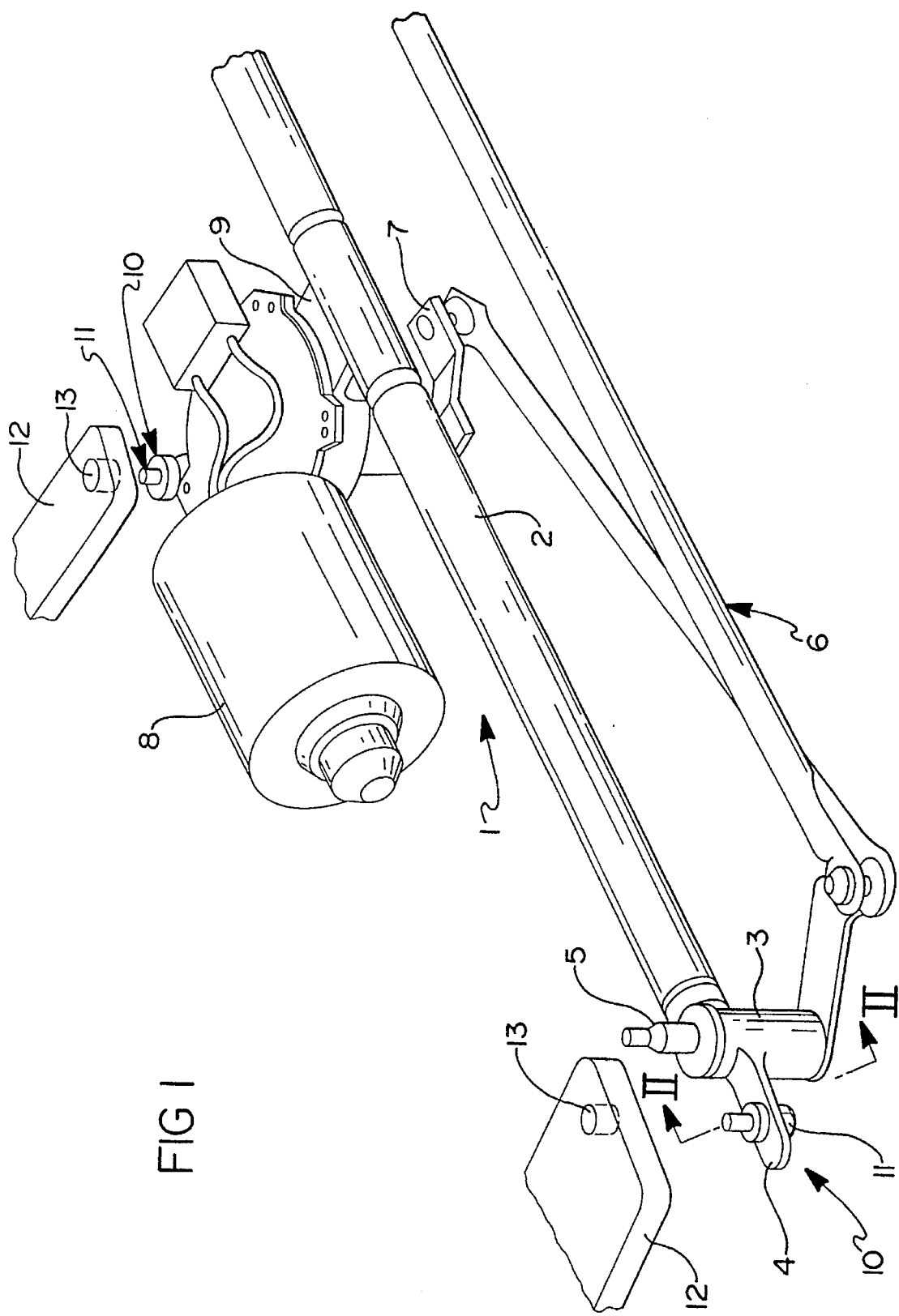
FIG. 1 is a schematic, perspective and partly cross-sectional view of a preassembled drive unit for windshield wipers, including sketched vehicle body parts to which the drive unit can be fastened.

FIG. 1 shows a partial schematic view of a drive unit for windshield wipers to be fitted as a preassembled unit in an automotive vehicle. The drive components required for driving the wiper arms (not shown) are mounted on a supporting frame 1 having a connecting rod 2. On the free ends of the connecting rod 2, transversely extending bushing-type bearing elements 3 are retained in anti-rotation manner, of which only the left one is shown in FIG. 1. The bearing element 3 includes a tongue-shaped fastening projection 4 on the outside periphery. A wiper shaft 5 is received in the bearing element 3 in a rotatable, but axially fixed manner. A wiper arm (not shown) can be secured unrotatably to the wiper shaft 5.

The wiper shafts 5, arranged on either end, are driven by way of a multipart coupling linkage 6 which connects both wiper shafts 5 for synchronizing the rotation, and by way of a crank 7 which, in turn, is unrotatably mounted on the drive shaft (not shown) of a drive motor 8. The drive motor 8 and its associated gear unit are attached to a bracket 9 retained on the connecting rod 2.

For the vibration damping attachment of the drive unit to the vehicle body, the supporting frame 1 has elastomeric vibration damping elements 10 of annular or hollow-cylindrical design on the fastening projections 4 of the bearing elements 3 and on the bracket 9. The vibration damping elements 10 are held captive in or on apertures of the fastening projections 4 through which in each case one assembly screw 11 (sketched only) is slipped and retained therein in the assembly position so as to be rotatable yet undetachable by a detachment prevention means (not shown in FIG. 1). The so preassembled drive unit for windshield wipers is attached at the destined locations in the engine compartment of the automotive vehicle to vehicle body parts 12 provided herefor. Only two body parts are represented schematically in FIG. 1. The vehicle body parts 12 have internally threaded attachment bores 13 in which the assembly screws 11 may be tightened.

Figure 2:
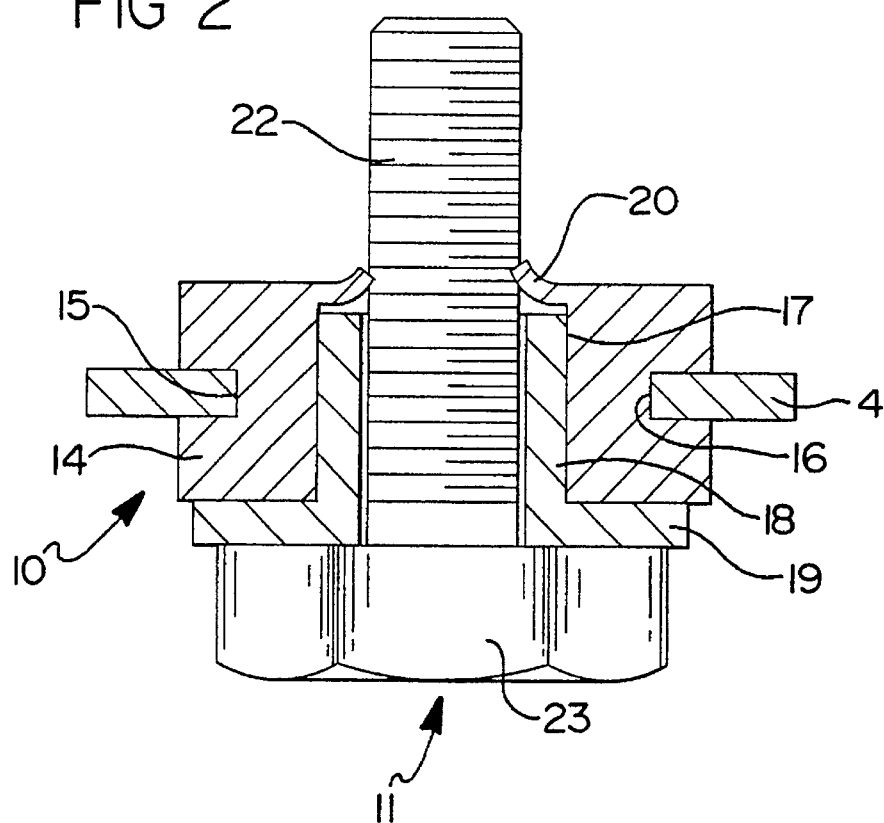
FIG. 2 is a cross-section taken along line II—II in FIG. 1 on an enlarged scale.

The vibration damping element 10 in FIG. 2 has a damping member 14 of hollow cylindrical or oval design which is made of rubber or a thermoplast. Roughly in its longitudinal central line, the damping member 14 has on its outside periphery an annular groove 15 by which it is retained (buttoned) in a through-bore 16 of the fastening projection 4 in a form-locking and undetachable manner.

A frontally inserted metallic spacer sleeve 18, having a collar 19 on one side, is press fit in the opening 17 in the damping member 14.

Figure 4:
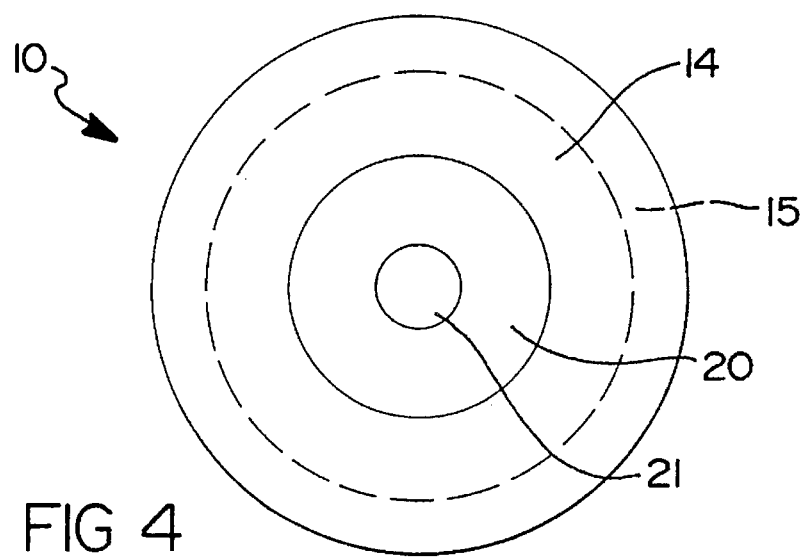
FIG. 4 is a top view of a circular vibration damping element without spacer sleeve and without assembly screw.
Figure 3:
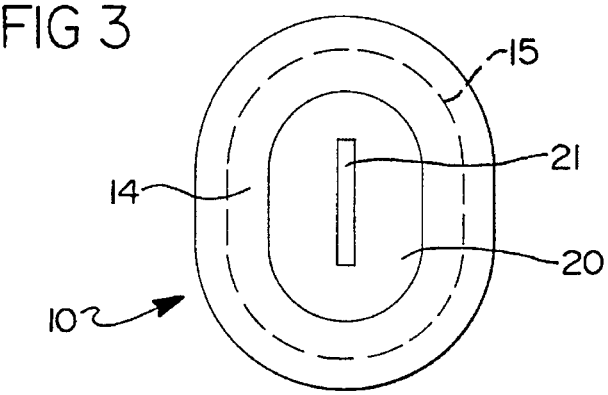
FIG. 3 is a top view of an oval vibration damping element without spacer sleeve and without assembly screw.
Figure 6:
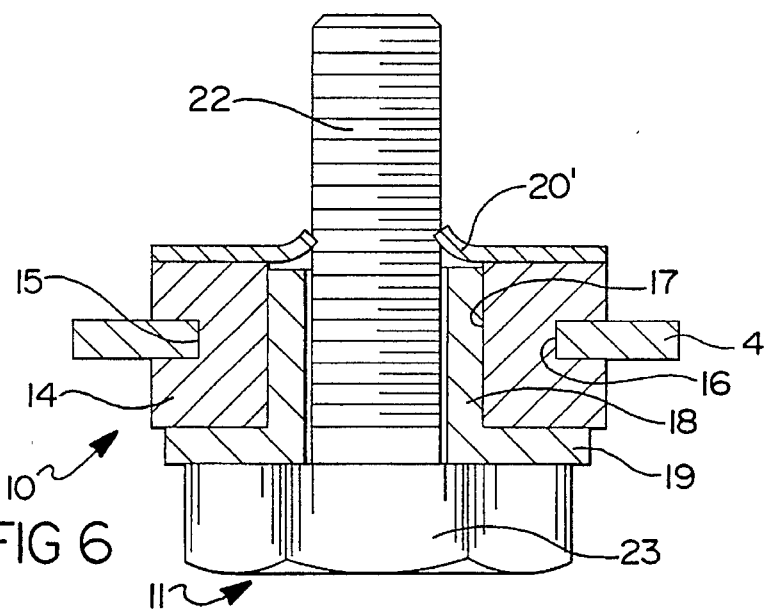
FIG. 6 is an embodiment of a vibration damping element where the elastomeric diaphragm is bonded to the vibration damping element.

The diameter of collar 19 corresponds roughly to the diameter of the damping member 14 and abuts with its surface on the lower frontal end of the damping member 14. The side of the opening 17, which is at the top in FIG. 2, is generally closed by a rubber-elastic diaphragm 20 which is integrally designed with the damping member 14. Alternatively, a diaphragm 20 of elastomeric material equal or equivalent to that of vibration damping element 14 may be cemented or vulcanized to a frontal end of the elastomeric vibration damping element 14 as seen in FIG. 6. Diaphragm 20 has a central hole 21 (FIG. 3 or 4). Diaphragm 20 forms a bottom for the opening 17 which has a smaller inside diameter than the thread diameter of the threaded stem 22 of the assembly screw 11. A small distance remains between the frontal end of the spacer sleeve 18, inserted into the opening 17 and the diaphragm 20, even in the position shown in FIG. 2 where the collar 19 of the spacer sleeve 18 abuts on the lower frontal end of the damping member 14.

The assembly screw 11 is inserted from below into the vibration damping element 10 in such a way that the threaded stem 22 is placed within the spacer sleeve 18 and, in addition, extends through the hole 21 of the diaphragm 20 and projects from the vibration damping element. The screw head 23 bears against the collar 19 of the spacer sleeve 18. The hole 21 of the diaphragm 20 is elastically expanded during insertion of the assembly screw 11 into the vibration damping element 10, and the edge of the hole 21 is clamped on the threaded stem 22 of the assembly screw 11 due to the elastic resetting force of the diaphragm.

This arrangement permits holding the assembly screw 11 captive in the assembly position, shown in FIG. 2, on the vibration damping element 10, while the necessary rotatability of the assembly screw 11 is ensured. To accommodate a vast range of assembly screw sizes, the thickness of the diaphragm 20 needs to be 0.5 to 1.5 times the pitch of the threads on the assembly screw's stem 22 in order to insure that the diaphragm 20 retains a sufficiently great elastic clamping force to secure the assembly screw 11. For a relatively small assembly screw 11, a diaphragm 20 with a thickness of approximately 0.5 times the pitch of the threaded stem 22 is sufficient while the use of a larger assembly screw 11 requires a diaphragm 20 with a thickness of approximately 1.5 times the pitch of the screw's thread stem 22 to retain the assembly screw 11 captive in the elastomeric vibration damping element 10.

It is clearly shown in FIG. 3 that, with a vibration damping element 10 having an oval damping member 14, the slotted oval hole 21 in the diaphragm 20, in the longitudinal direction, corresponds to the oval shape of the damping member 14. The inside width of the hole 11 is smaller than the diameter of the threaded stem 22 of the assembly screw 11 to be inserted herein, while the length of the hole 21 may be larger than the thread diameter of the fastening screw 11. In this arrangement, relative displacement of the fastening screw 11 in relation to the damping member 14 within the longitudinal extension of the hole 21 is possible. This displacement ability may be utilized for an exact adjustment during assembly of the drive unit for windshield wipers on the vehicle.

FIG. 4 shows the central positioning of the hole 21 in the diaphragm 20 of the damping member 14. The diameter of the circular hole 21 is smaller than the thread diameter of the threaded stem 22 of the assembly screw 11 used. Other cross-sectional shapes of the hole 21 are also possible. However, it must always be ensured that at least one inside width of the hole is smaller than the thread diameter of the fastening screw 11 in order that the edge of hole 21 is elastically clamped on the threaded stem 22.

Figure 5:
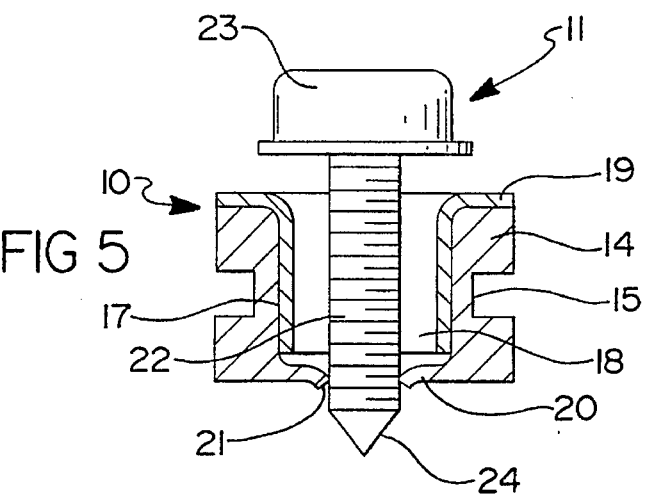
FIG. 5 is an embodiment of a vibration damping element where an acute assembly screw is used.

In the embodiment shown in FIG. 5, an assembly screw 11 is used which has a relatively acute tip 24. Such screws are known as sheet-metal self-tapping screws, for example. In the vibration damping element 10 shown, in turn, a spacer sleeve 18 with a collar 19 on one side is inserted into the opening 17 of the damping member 14. The diaphragm 20 closing the bottom of the opening 17 does not have a hole 21 in its initial shape. Hole 21 is made only during the preassembly of the vibration damping attachment.

When the assembly screw 11 is inserted in an axial direction, from above in FIG. 5, and force is correspondingly applied in an axially downward direction and the assembly screw is possibly turned at the same time, the tip 24 of the assembly screw pierces the diaphragm 20. It is ensured in any case by the so produced hole 21 in the diaphragm 20 that the inside width of the hole 21 is smaller than the thread diameter of the threaded stem 22 of the assembly screw 11. Thus, it is also ensured that the assembly screw 11 is held captive in its assembly position on the vibration damping element 10. When using a sheet-metal self-tapping screw as assembly screw 11, the desired assembly position of the assembly screw 11 might correspond to the position shown in FIG. 5. However, it would not present any difficulties to insert the assembly screw 11 into the damping member 14 so that the screw head 23 abuts on the collar 19 of the spacer sleeve 18.

I claim:

1. A vibration damping attachment for a drive unit for windshield wipers on automotive vehicles, the drive unit of the type including a retainer at a predetermined attachment point for accommodating a fastener for fastening the drive unit to the automotive vehicle, the vibration damping attachment comprising:

a fastener of a predetermined diameter;

an elastomeric vibration damping element attached to said retainer and receiving said fastener, said elastomeric vibration damping element including an opening in the elastomeric vibration damping element; and an elastomeric diaphragm disposed across and closing the opening of said elastomeric vibration damping element, and the diaphragm in an undeformed condition having a central hole with a smaller inside diameter than the predetermined diameter of the fastener wherein said fastener is held captive on the elastomeric vibration damping element by said diaphragm clamping said fastener at the central hole.

2. A vibration damping attachment as claimed in claim 1, wherein the elastomeric diaphragm is bonded to the elastomeric vibration damping element.

3. A vibration damping attachment as claimed in claim 1, wherein the elastomeric diaphragm is designed integrally with the elastomeric vibration damping element.

4. A vibration damping attachment as claimed in claim 1, wherein the elastomeric diaphragm forms a bottom for the opening of the elastomeric vibration damping element through which a tip of the fastener protrudes.

5. A vibration damping attachment as claimed in claim 1, wherein the fastener includes a threaded portion and the thickness of the elastomeric diaphragm is 0.5 to 1.5 times a pitch of threads on said fastener.

6. A vibration damping attachment as claimed in claim 1, wherein the central hole in the elastomeric diaphragm has a slotted shape, the width of which is smaller than the diameter of the fastener.

7. A vibration damping attachment as claimed in claim 6, wherein the fastener includes a threaded portion and wherein a width of the slotted shape hole in the elastomeric diaphragm is smaller than a core diameter of the threaded portion.

8. A vibration damping attachment as claimed in claim 1, wherein the opening of the elastomeric vibration damping element has a generally circular shape.

9. A vibration damping attachment as claimed in claim 1, wherein a spacer sleeve has a collar on a first side and resides in the opening of the elastomeric vibration damping element with the collar abutting an end of the elastomeric vibration damping element, and a second side of the sleeve extends into the elastomeric vibration damping element toward the elastomeric diaphragm wherein a small distance is provided between the second side of the spacer sleeve and the elastomeric diaphragm.

10. A vibration damping attachment as claimed in claim 1, wherein the opening of the elastomeric vibration damping element has a generally oval shape and wherein said central hole of said elastomeric diaphragm is in the form of a slotted hole.

11. A vibration damping attachment for a drive unit for windshield wipers on automotive vehicles, the drive unit of the type including a retainer at a predetermined attachment point for accommodating a fastener for fastening the drive unit to the automotive vehicle, the vibration damping attachment comprising:

a fastener of a predetermined diameter;

an elastomeric vibration damping element attached to said retainer and receiving said fastener, said elastomeric vibration damping element including an opening in the elastomeric vibration damping element and; and an elastomeric diaphragm disposed across and closing the opening of said elastomeric vibration damping element in an undeformed condition and engaging said fastener, wherein said fastener is held captive on the elastomeric vibration damping element by said elastomeric diaphragm clamping said fastener.

12. A vibration damping attachment as claimed in claim 11, wherein the elastomeric diaphragm contains no opening.

13. A vibration damping attachment as claimed in claim 12, wherein the fastener within the opening of the elastomeric vibration element pierces a central hole in the elastomeric diaphragm.

14. A vibration damping attachment as claimed in claim 12, wherein the opening of the vibration damping element has a generally oval shape.

15. A vibration damping attachment as claimed in claim 14, wherein the fastener within the opening of the elastomeric vibration damping element pierces a central hole in the elastomeric diaphragm.

16. A vibration damping attachment as claimed in claim 11, wherein the elastomeric diaphragm is bonded to the elastomeric vibration damping element.

17. A vibration damping attachment as claimed in claim 11, wherein the elastomeric diaphragm is integral with the elastomeric vibration damping element.

18. A vibration damping attachment as claimed in claim 11, wherein the elastomeric diaphragm forms a bottom for the opening of the elastomeric vibration damping element, through which a tip of the fastener protrudes.

19. A vibration damping attachment as claimed in claim 11, wherein the fastener includes a threaded portion and a thickness of the elastomeric diaphragm is 0.5 to 1.5 times a thread pitch of said threaded portion.

20. A vibration damping attachment as claimed in claim 11, wherein a spacer sleeve having a collar on one side resides in the opening of the elastomeric vibration damping element such that, with the collar abutting on the frontal end of the elastomeric vibration damping element, a small distance is provided between the frontal end of the spacer sleeve positioned in the opening and the diaphragm.

* * * * *

UNITED STATES PATENT AND TRADEMARK OFFICE
CERTIFICATE OF CORRECTION

PATENT NO. : 5,609,329
DATED : March 11, 1997
INVENTOR(S) : Scholl

It is certified that error appears in the above-indentified patent and that said Letters Patent is hereby corrected as shown below:

Column 7, line 28, please delete "and; and" and insert --; and--

Signed and Sealed this

First Day of July, 1997

Attest:

Attesting Officer

BRUCE LEHMAN

Commissioner of Patents and Trademarks